United States Patent
Plevnik et al.

(10) Patent No.: US 12,075,847 B2
(45) Date of Patent: Sep. 3, 2024

(54) AEROSOL GENERATING SYSTEM INCLUDING AN AEROSOL GENERATING DEVICE AND A CHARGING STORAGE CASE

(71) Applicant: JT International S.A., Geneva (CH)

(72) Inventors: Marko Plevnik, London (GB); Norihiko Inoue, London (GB); Jamie Buckley, Surrey (GB); Layth Bouchuiguir, Bellevue (CH)

(73) Assignee: JT International S.A. (CH)

( * ) Notice: Subject to any disclaimer, the term of this patent is extended or adjusted under 35 U.S.C. 154(b) by 685 days.

(21) Appl. No.: 17/285,595

(22) PCT Filed: Oct. 18, 2019

(86) PCT No.: PCT/EP2019/078374
§ 371 (c)(1),
(2) Date: Apr. 15, 2021

(87) PCT Pub. No.: WO2020/079226
PCT Pub. Date: Apr. 23, 2020

(65) Prior Publication Data
US 2021/0315282 A1 Oct. 14, 2021

(30) Foreign Application Priority Data
Oct. 19, 2018 (EP) .................................. 18201625

(51) Int. Cl.
*A24F 40/95* (2020.01)
*A24F 7/00* (2006.01)
(Continued)

(52) U.S. Cl.
CPC ............. *A24F 40/95* (2020.01); *A24F 7/00* (2013.01); *A24F 40/40* (2020.01); *A24F 40/42* (2020.01);
(Continued)

(58) Field of Classification Search
CPC .. A24F 40/95; A24F 7/00; A24F 40/40; A24F 40/42; A24F 40/65; A24F 40/90;
(Continued)

(56) References Cited

U.S. PATENT DOCUMENTS

| 2014/0224267 A1* | 8/2014 | Levitz | A24F 40/40 |
| | | | 320/108 |
| 2015/0328415 A1* | 11/2015 | Minskoff | A24F 40/60 |
| | | | 128/202.21 |

(Continued)

FOREIGN PATENT DOCUMENTS

| JP | 2018527906 A | 9/2018 |
| KR | 200448273 Y1 | 3/2010 |

(Continued)

OTHER PUBLICATIONS

International Search Report for Application No. PCT/EP2019/078374, dated Feb. 5, 2020, 3 pages.

*Primary Examiner* — Justin M Kratt
(74) *Attorney, Agent, or Firm* — Lerner David LLP

(57) ABSTRACT

An aerosol generating system includes an aerosol generating device and a charging case for charging the aerosol generating device when it is received in the case. The aerosol generating device includes a device battery; a heating chamber including a lid arranged to move between an open and closed position to allow a consumable to be received in the heating chamber. The charging case includes a case battery; a receiving means for receiving the aerosol generating device in a charging position within the case. When the aerosol generating device is received in the charging position: the device battery is connectable to the case battery to charge the device battery; and the lid of the heating chamber is moveable to allow a consumable to be inserted or removed from the heating chamber by a user.

15 Claims, 5 Drawing Sheets

(51) Int. Cl.
    *A24F 40/40*     (2020.01)
    *A24F 40/42*     (2020.01)
    *A24F 40/65*     (2020.01)
    *A24F 40/90*     (2020.01)
    *A24F 40/10*     (2020.01)
    *A24F 40/20*     (2020.01)
    *A24F 40/30*     (2020.01)
    *A45C 11/00*     (2006.01)
    *H01F 7/00*     (2006.01)

(52) U.S. Cl.
    CPC .............. *A24F 40/65* (2020.01); *A24F 40/90* (2020.01); *A24F 40/10* (2020.01); *A24F 40/20* (2020.01); *A24F 40/30* (2020.01); *A45C 11/00* (2013.01); *H01F 7/00* (2013.01); *H01M 2220/30* (2013.01); *Y02E 60/10* (2013.01)

(58) Field of Classification Search
    CPC .......... A24F 40/10; A24F 40/20; A24F 40/30; A45C 11/00; H01F 7/00; H01M 2220/30; Y02E 60/10

See application file for complete search history.

(56) References Cited

U.S. PATENT DOCUMENTS

| | | | |
|---|---|---|---|
| 2017/0064997 A1* | 3/2017 | Murison | ................ A24F 40/53 |
| 2017/0086498 A1 | 3/2017 | Daryani | |
| 2017/0273357 A1* | 9/2017 | Barbuck | .................. H05B 3/04 |
| 2017/0319799 A1 | 11/2017 | Yamada et al. | |
| 2018/0020727 A1 | 1/2018 | Hoffman et al. | |
| 2018/0177234 A1 | 6/2018 | Lee | |
| 2018/0295882 A1 | 10/2018 | Ricketts | |

FOREIGN PATENT DOCUMENTS

| | | |
|---|---|---|
| KR | 20120003872 A | 1/2012 |
| KR | 101232619 B1 | 2/2013 |

\* cited by examiner

AEROSOL GENERATING SYSTEM INCLUDING AN AEROSOL GENERATING DEVICE AND A CHARGING STORAGE CASE

CROSS-REFERENCE TO RELATED APPLICATIONS

The present application is a national phase entry under 35 U.S.C. § 371 of International Application No. PCT/EP2019/078374, filed Oct. 18, 2019, published in English, which claims priority to European Application No. 18201625.3 filed Oct. 19, 2018, the disclosures of which are incorporated herein by reference.

TECHNICAL FIELD

The present disclosure relates to an aerosol generating system comprising an aerosol generating device and a case for charging the aerosol generating device.

TECHNICAL BACKGROUND

Aerosol generating devices such as electronic cigarettes are relatively well known and are becoming increasingly popular with consumers in recent years. A common operating principle for such electronic cigarettes is to heat a consumable without burning it to provide an aerosol (also referred to as a vapour) to a user for inhalation. Examples of such consumables include charges of tobacco material or capsules of liquid containing flavourants and/or active ingredients such as nicotine.

Aerosol generating devices often comprise a heater, a power source for supplying electricity to the heater and a receptacle, such as a heating chamber, for receiving the consumable in the vicinity of the heater such that the consumable may be heated to produce the vapour for inhalation.

In recent years the popularity of multiple use aerosol generating devices has surpassed that of single use devices which are disposed of after use. Since, the consumable can only provide the required active ingredients or flavourants for a limited duration of heating before these components are depleted, in multiple use devices the consumable must be replaced. This is generally achieved by removing the depleted consumable from the heating chamber and replacing with a new consumable.

Similarly the power source within the aerosol generating device will also be depleted after a certain degree of use and will need to be recharged or replaced. For example, known aerosol generating systems include a charging component such as a mains power cable for charging the battery of the aerosol generating device.

There are however several shortcomings with such aerosol generating devices and systems. In particular, the replacement of the consumable is often an awkward process for the user, given the size of the components and the requirement to manoeuvre the aerosol generating device into the appropriate orientation while removing the spent consumable and replacing with a new consumable. This process has to be carried out regularly which exacerbates the problem.

Similarly the requirement to regularly charge the battery presents a further annoyance to the consumer as this requires that the charging component such as the power cable must be carried with the consumer for use when required. The cable is often bulky and therefore inconvenient to carry with the user. Furthermore, if the cable is forgotten or misplaced, the device can only be used for a short duration before the battery is depleted.

Therefore, there is need to provide an aerosol generating system which addresses one or more of these shortcomings.

SUMMARY OF THE DISCLOSURE

According to a first aspect of the present disclosure, there is provided an aerosol generating system comprising an aerosol generating device and a charging case for charging the aerosol generating device when it is received in the case, the aerosol generating device comprising: a device battery; a heating chamber comprising a lid arranged to move between an open and closed position to allow a consumable to be received in the heating chamber; the charging case comprising: a case battery; a receiving means for receiving the aerosol generating device in a charging position within the case; wherein, when the aerosol generating device is received in the charging position: the device battery is connectable to the case battery to charge the device battery; and the lid of the heating chamber is moveable to allow a consumable to be inserted or removed from the heating chamber by a user.

By providing an aerosol generating device including a charging case, the frequency with which the device must be charged is reduced since, given the intrinsic larger volume of the case, a larger battery may be included in the case than the device. By charging the device with the larger volume battery, the device may be used for longer periods of time before a user must recharge from the mains. Furthermore the inconvenience of carrying a power cable is avoided as the device may be charged by simply carrying within the case, which can also be a less cumbersome shape and thus less of an inconvenience to carry. Since the case includes a receiving means arranged such that, when the device is in the charging position, the lid of the heating chamber is moveable, the process of exchanging the consumable is more straightforward. In particular, the aerosol generating device may be supported within the case in the receiving means during exchange, thus reducing the level of dexterity required in replacing the consumable. Furthermore, exchange of the consumable and charging of the battery may be carried out simultaneously, thus further simplifying the required replenishing processes.

The phrase "connectable to the case battery" encompasses the possibilities that the battery of the aerosol generating device is automatically connected to the battery of the case upon the device being received in the charging position, for example by physical connection of corresponding contacts or wireless connection, or that, while the aerosol generating device is received in the charging position, the connection between the device battery and case battery may be made by a user, for example by activating a switch, which initiates the charging by a physical or wireless connection.

The receiving means may be arranged to only accept the aerosol generating device in one or more specific orientations, where one or more of the specific orientations correspond to the charging position. In some examples, the device must be orientated in a certain way in order to be accepted and releasably retained by the receiving means in the charging position. Alternatively the receiving means may receive the device in a plurality of orientations, one or more of which correspond to a charging position in which the battery of the device is connectable to the case battery.

The receiving means may be arranged such that when the aerosol generating device is received in the case the heating chamber lid faces outwards such that it is accessible to a user. In particular, the charging position corresponds to a position in which the lid of the heating chamber is exposed when the case is open, allowing the lid to be moved between the open and position while it is received in the receiving means. For example, the receiving means may be arranged to accept a side of the aerosol generating device which is on the reverse side of the device to the heating chamber lid. In particular the receiving means may be arranged to only accept the reverse side of the device to the heating chamber lid. In this way, when the device is received in the case, the heating chamber lid faces outwards and is moveable by the user to open and close the heating chamber while the device is in the charging position. This may be achieved using a recess which is shaped so as to accept the reverse side of the device; and/or one or more magnets arranged to attract the reverse side of the device; and/or a clasp which will only secure the device when it is positioned with the heating chamber lid facing outwards.

The definition of the lid of the heating chamber as "moveable" means that it faces outwards and is not obstructed by the receiving means such that, when the case is open, the lid of the heating chamber is moveable between the open and closed position while the aerosol generating device is received in the case.

In some examples of the invention the aerosol generating device and charging case comprise corresponding electrical contacts arranged such that they connect the battery of the device to the case battery when the aerosol generating device is in the charging position. For example, the aerosol generating device may comprise contacts on an outer surface of the device which are positioned such that they meet corresponding contacts positioned within the case when the aerosol generating device is in the charging position. The contacts may be arranged such that the device may be placed into the case in any orientation, for example the contact may extend around the circumference of the device body, or they may be arranged such that the device is only charged when it is placed into a specific orientation corresponding to the charging position, for example on a side of the device opposite the heating chamber lid. The provision of electrical contacts provides a reliable means to connect the corresponding batteries and allows for configuration of the case such that the device only charges in certain orientations. Therefore the aerosol generating device may be carried in the case both with or without charging.

In some examples of the aerosol generating system, the device battery is wirelessly connectable to the case battery when the aerosol generating device is in the charging position. The wireless connection may be initiated automatically or by a user activated switch. Using a wireless connection, the device may be charged irrespective of any specific orientation. Furthermore, wireless charging may further allow charging while the device is outside of, but in the vicinity of the case.

In some examples of the invention, the charging case further comprises a case lid moveable between: a closed position in which the aerosol generating device is retained in the case; and an open position in which the heating chamber lid of the aerosol generating device is accessible to allow movement of the heating chamber lid between the open and closed position when the aerosol generating device is received in the case. The case lid may be movable by a hinged connection, a slide connection or it may be a detachable component. The case lid protects the aerosol generating device while it is housed in the case, allowing for easy transportation. Preferably the case lid can be closed only when the heating chamber lid is in closed position. In this way, a user cannot inadvertently forget to close the heating chamber lid.

The lid to the heating chamber is preferably enclosed within the case and inaccessible to a user when the case lid is in the closed position. In this way, the lid of the heating chamber is prevented from opening inadvertently.

In certain examples of the invention, the receiving means are arranged to releasably retain the aerosol generating device in the charging position. For example, the aerosol generating device is held in the case in the charging position until an appropriate force is applied by the user to extract the device or a release means such as a button or switch is pressed.

The receiving means may be arranged to releasably retain the aerosol generating device by the provision of one or more of: a recess within the case which has a shape conforming to the shape of the aerosol generating device, such that the aerosol generating device is retained via a friction fit within the recess; one or more magnets on the device and/or case to provide an attractive force; a mechanical clasp arranged to grip the aerosol generating device.

As described above, the receiving means may be arranged such as to only reliably retain the device in the charging position in which the battery of the aerosol generating devices is connected or connectable to the battery of the case and the lid of the heating chamber is moveable to allow a consumable to be exchanged.

In some examples of the aerosol generating system according to the present invention, the receiving means is a recess which is shaped so as to only accept the reverse side of the aerosol generative device to the heating chamber lid such that the heating chamber lid faces outwards from the case when the aerosol generating device is received in the case.

In some examples of the aerosol generating system, the aerosol generating device further comprises a mouthpiece and the mouthpiece or a portion of the mouthpiece extends outside of the case when the aerosol generating device is received in the charging position such that a user can inhale vapour from the device during charging. In this way a user continue to use the aerosol generating device when it is stored and/or charging in the case.

The mouthpiece may extend outside of the case when the case lid is in the open position but is covered by the case lid and retained within the closed case when the case lid is in the closed position. In this way, the benefits described above in relation to use of the device while charging are provided by the mouthpiece may be protected by covering with the case lid to enclose the entirety of the device when required. In other examples, the mouthpiece of the device may extend outside of the case irrespective of the position of the case lid such that the device, and in particular the heating chamber is covered within the case, but at least a portion of the mouthpiece remains extending outside of the case. In such cases the invention may further comprise a mouthpiece cap arranged to cover the mouthpiece of the aerosol generating device. Furthermore, in such cases the heater of the aerosol generating device may be activated while the case lid is closed. For example a switch may be provided on the outside of the case which activates the heater to allow use of the device when it is enclosed in the case. The switch may be connected to the device heater via corresponding electrical contacts on the device and in the receiving means or it may be activated by wireless connection. Alternatively, there may be an opening in the case through which an activation switch on the device itself may be accessed when the device is received in the receiving means and the lid of the case is closed.

The aerosol generating device may be configured for use with various types of consumables containing an aerosol generating substance. The consumable may be a capsule which includes in use an aerosol generating substance inside an air permeable material. Alternatively, the consumable may be an aerosol generating substance held inside a material that is not air permeable, but which comprises appropriate perforation or openings to allow air flow. Alternatively, the consumable may be the aerosol generating substance itself. Alternatively, the body of the consumable is formed substantially in the shape of a stick which may have a mouthpiece filter. The consumable may be an elongate, preferably substantially cylindrical shape, with a mouthpiece at one end. In this case the consumable may include a sheet such as paper wrapped the aerosol generating substance.

The material including the aerosol generating substance may have a high air permeability to allow air to flow through the material with a resistance to high temperatures. Examples of suitable air permeable materials include cellulose fibres, paper, cotton and silk. The air permeable material may also act as a filter. Alternatively, the body may be the aerosol generating substance wrapped in paper.

The aerosol generating substance may be any suitable substance capable of forming an aerosol. The substance may be solid or semi-solid substance. The substance may comprise plant derived material and in particular, the substance may comprise tobacco. Typically, the aerosol generating substance is a solid or semi-solid tobacco substance. Example types of aerosol generating solids include powder, granules, pellets, shreds, strands, porous material, foam or sheets. In certain preferable examples the consumable comprises solid or semi-solid foam tobacco material.

Preferably, the aerosol generating substance may comprise an aerosol-former. Examples of aerosol-formers include polyhyrdric alcohols and mixtures thereof such as glycerine or propylene glycol. Typically, the aerosol generating substance may comprise an aerosol-former content of between approximately 5% and approximately 50% on a dry weight basis. Preferably, the aerosol generating substance may comprise an aerosol-former content of approximately 15% on a dry weight basis.

In some examples of the invention, the charging case comprises a consumable storage arranged to retain one or more consumables configured for use with the aerosol generating device. This simplifies the consumable exchange process further as the replacement consumables may be provided within the case such that a user may select a consumable and replace a spent consumable while the aerosol generating device is held in the receiving means and possibly also charging. Furthermore, the exchange process can be carried out with one hand as the case supports the aerosol generating device and replacement consumables. In particular, the case may be opened, the lid of the heating chamber opened, the spent consumable removed and a replacement capsule selected from the consumable storage and placed into the heating chamber. These steps can take place while the aerosol generating device is charging. This allows the consumable exchange operation to be performed anywhere and on the move.

In some examples of the invention, the charging case comprises a second consumable storage arranged to store one or more used consumables.

In such examples, when the charging case comprises a case lid as described above, the consumable storage may be accessible to a user when the case lid is in the open position and enclosed within the case when the case lid is in the closed position. For example, the consumable storage portion may be provided on an inner side of the case lid such that the consumables are easily accessible when the lid is in the open position. In this way, the process of exchanging the consumable is further simplified.

The heating chamber lid may be movable by a hinged connection, a slide connection or it may be a detachable component.

According to another aspect of the invention, there is provided a charging case for an aerosol generating device comprising a device battery and a heating chamber with a lid arranged to move between an open and closed position to allow a consumable to be received in the heating chamber; the charging case comprising: a case battery; a receiving means configured to receive the aerosol generating device in a charging position within the case; wherein, when the aerosol generating device is received in the charging position: the case battery is connectable to the device battery to charge the device battery; and the aerosol generating device is oriented to expose the lid of the heating chamber to allow a consumable to be inserted or removed from the heating chamber by a user.

The charging case may have any of the above features described in relation to the aerosol generating system.

DETAILED DESCRIPTION OF EMBODIMENTS

Embodiments of the present disclosure will now be described by way of example only and with reference to the accompanying drawings.

Figure 1:
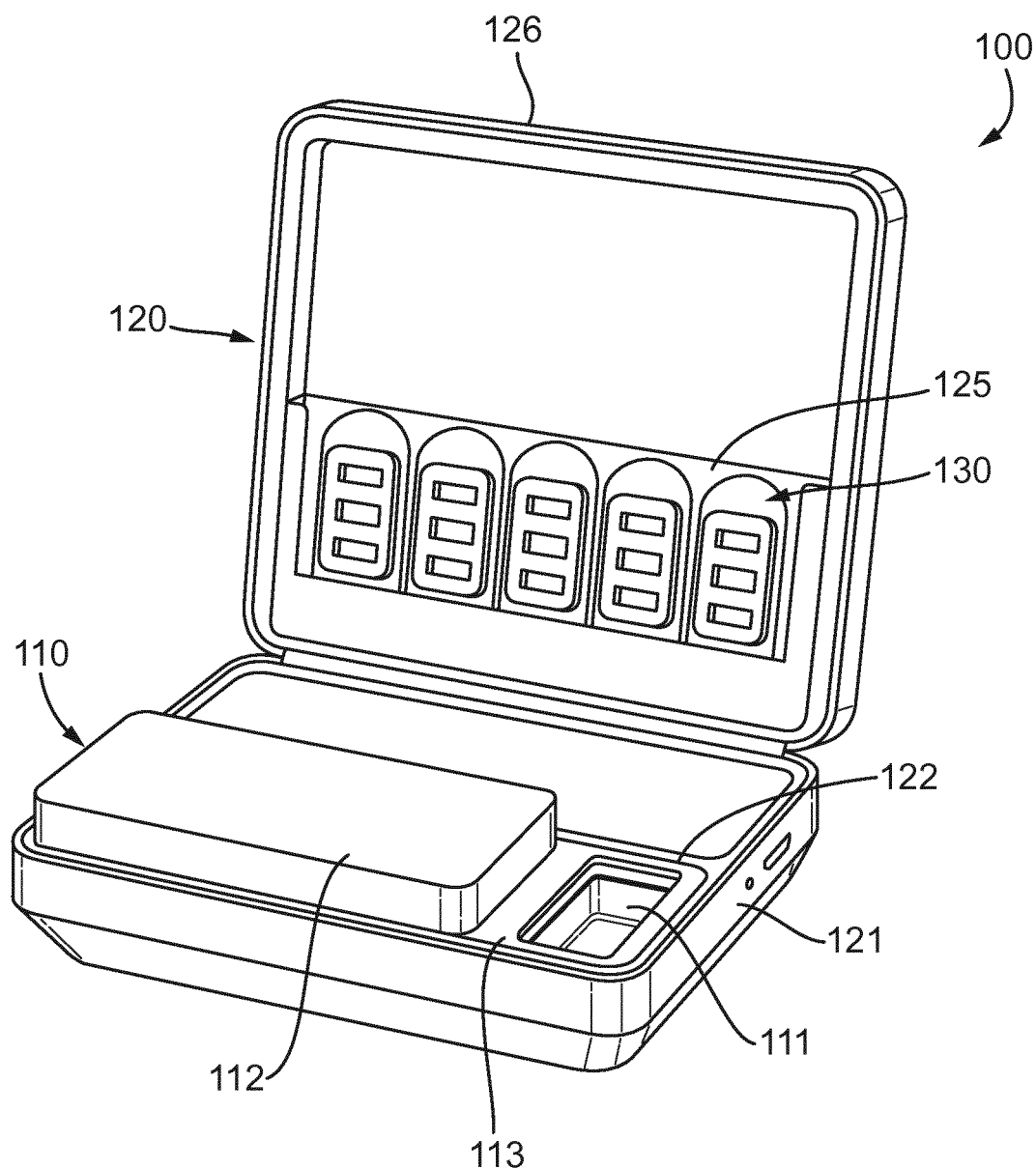
FIG. 1 is a schematic illustration of an aerosol generating system according to the present invention.

FIG. 1 schematically illustrates an aerosol generating system 100 according to the present invention. The system includes an aerosol generating device 110 and a charging case 120 for charging the aerosol generating device 110 when it is received within the case 120. The aerosol generating device 110 includes a device battery (not shown) within the body 113 of the device 110 and a heating chamber 111 comprising a lid 112 arranged to move between an open and closed position to allow a consumable 130 to be received in the heating chamber 111. The charging case includes a body 121 which houses a case battery (not shown). The charging case 120 also includes a receiving means 122 for receiving the aerosol generating device 110 in a charging position within the case 120. When the aerosol generating device 110 is received in the receiving means 122, as shown in FIG. 1, firstly the device battery is connectable to the case battery to charge the device battery and, secondly, the lid 112 of the heating chamber 111 is moveable between the open and close position such that the heating chamber 111 is accessible to allow a consumable 130 to be inserted or removed from the heating chamber 111 by a user.

Figure 2A:
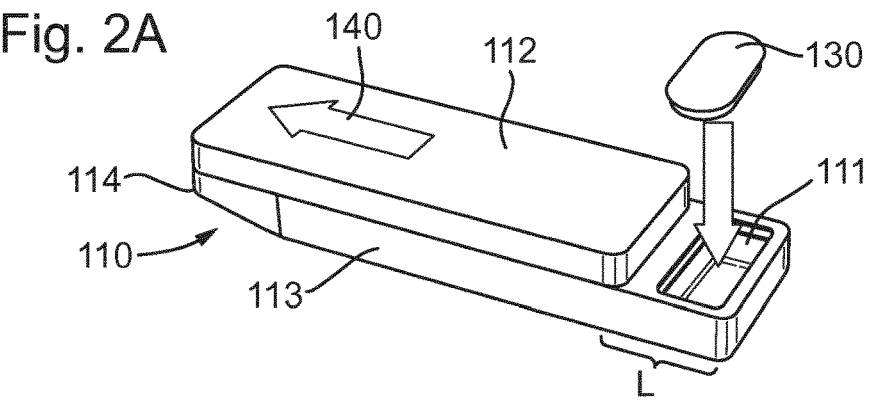
FIGS. 2A to 2D are schematic illustrations of an aerosol generating device, showing the consumable exchange procedure.
Figure 2B:
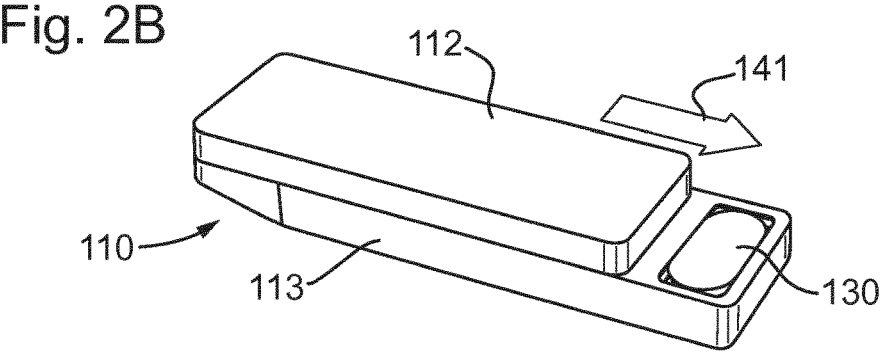
Figure 2C:
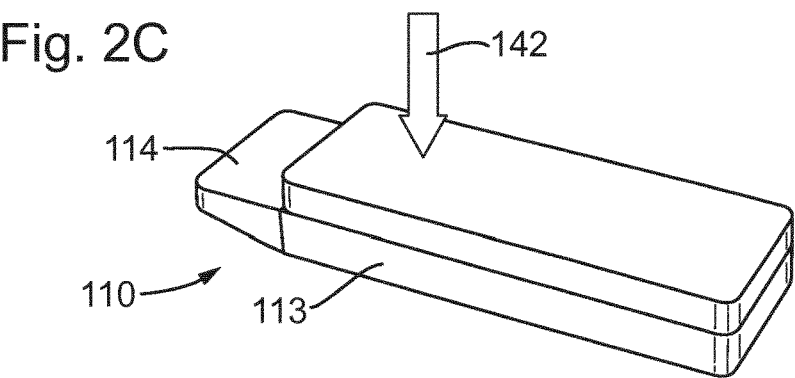
Figure 2D:
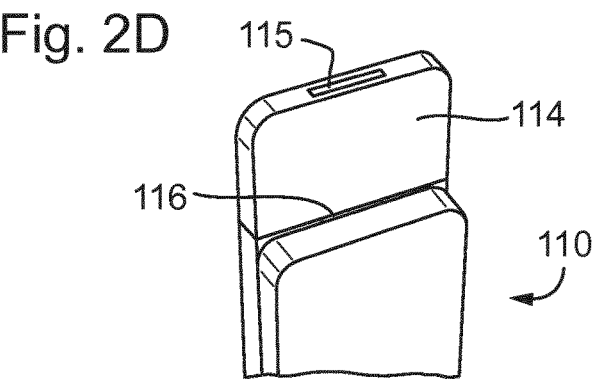

FIGS. 2a to 2d schematically illustrate the aerosol generating device 110 according to an example of the present invention. The aerosol generating device has an elongate body formed, in this example, by main body portion 113 and slideable portion 112. As can be seen in FIG. 2, in this example the lid 112 to the heating chamber 111 is provided by the slidable portion 112 of the body which may be translated in a direction 140 aligned with the elongate axis of the device 110 in order to expose the heating chamber 111. In this example, the body of the device 110 has a flattened elongate shape with a substantially rectangular main body portion 113 which houses the device battery, the heater (not shown) and the heating chamber 111. The lid 112 is provided by a substantially rectangular flattened elongate portion of the body which is slidably engaged with the main portion 113 and is movable via the slide connection between an open position, as shown in FIG. 2a and FIG. 2b and a closed position as shown in FIG. 2c. The body is thus formed by the two substantially cuboid body portions (the main body 113 and lid 112) which are in contact at corresponding opposing faces.

The lid portion 112 is shorter in length than the main body portion 113 by a length L, shown in FIG. 2A, such that a portion of the contacting face of the main body portion 113 remains exposed, irrespective of the position of the lid portion 112. Therefore, by sliding the lid portion 112 in direction 140 towards the mouthpiece end 114 of the main body 113 the heating chamber 111 is exposed and by sliding the lid portion 112 towards the heating chamber 111 end, the mouthpiece end 114 of the main body 113 is exposed.

In order to exchange the consumable 130, the lid portion 112 is slid by the consumer from the closed position shown in FIG. 2c to the open position shown in FIG. 2a by applying a force in the direction 140 in order to translate the lid portion relative to the base portion 113 and expose the heating chamber 111. The consumable 130 may then simply be placed into the heating chamber 111, as shown in FIG. 2a. The consumable may be of a corresponding size and shape to the heating chamber 111, as shown, such that placing it into the chamber 111 aligns it in the correct orientation relative to the heater. Once the consumable 130 is positioned within the chamber, as shown in FIG. 2b, the lid 112 is slid in the opposite direction towards the heating chamber end, indicated by arrow 141, in order to translate the lid 112 relative to the main body portion 113 such that the lid 112 slides over the received consumable 130 within the chamber in order to close the lid, enclosing the consumable 130 in the chamber 111.

Once the lid is moved in direction 141 into the closed position shown in FIG. 2c, the heating chamber 111 may be activated in order to heat the consumable 130 to produce an inhalable aerosol vapour. In the example of FIG. 2, the device may be activated by pressing the lid 112 inwards, in a direction 142 substantially normal to the flat surface of the lid 112 towards the main body portion 113. By pressing the lid in this way a switch may be activated which activates the device. In other examples of the aerosol generating device a switch may be provided on an external surface of the device 110 or the heater may be activated by according to a pressure change sensed by a pressure sensor in the device, induced by inhaling at the mouthpiece 114.

As shown in the example of FIG. 2, when the lid portion 112 is slid to the closed position shown in FIG. 2c a portion of the main body 113 protrudes outwards in the elongate direction to provide the mouthpiece 114. As shown more clearly in FIG. 2d, the end surface of the protruding portion of the base 113 includes an inhalation outlet 115 through which the generated aerosol may be inhaled by the user. The device may further include an LED 116 as shown in FIG. 2d which illuminates when the device is successfully activated.

Figure 3A:
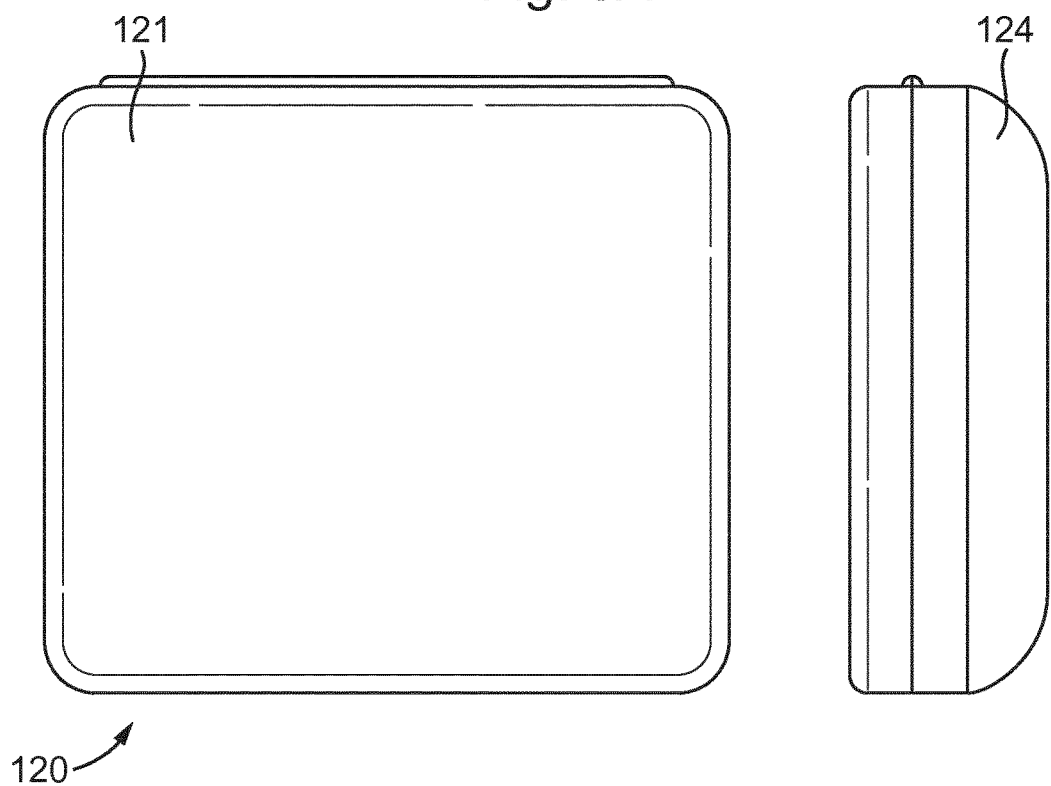
FIG. 3A shows an external view of a charging case for an aerosol generating device from a side and end view.
Figure 3B:
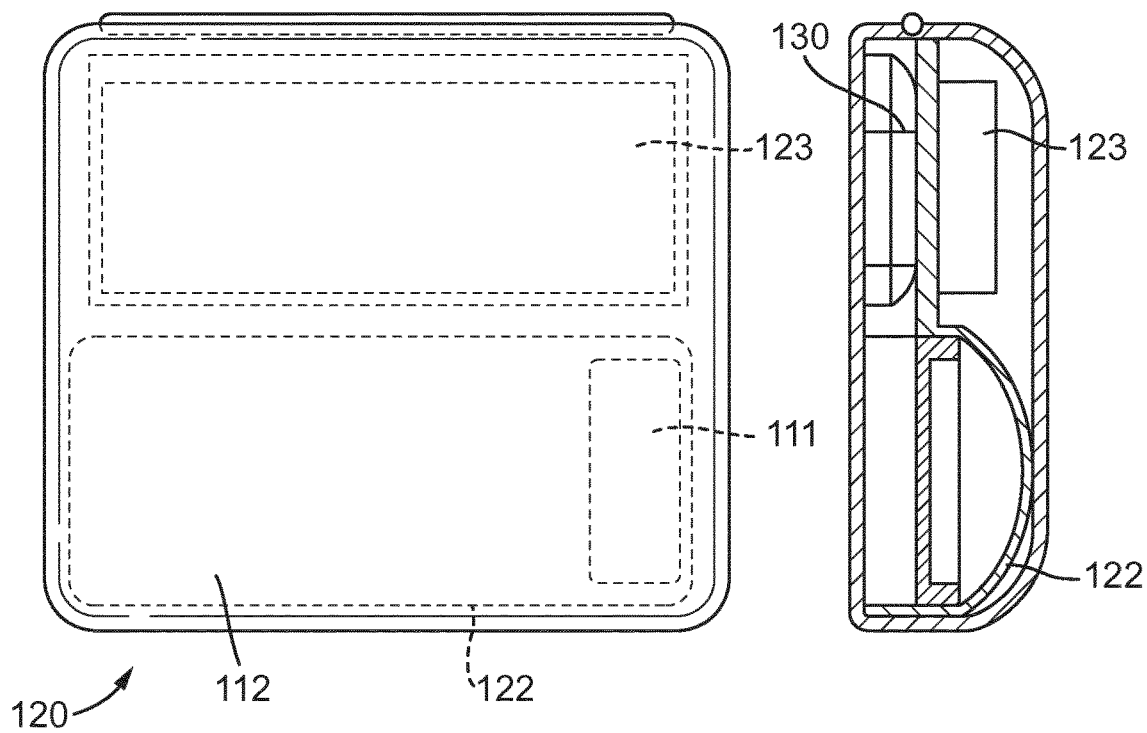
FIG. 3B shows an internal view of a charging case for an aerosol generating device from a side and end view.

An example of a charging case included in the system of the present invention is shown in FIG. 3. FIG. 3a shows an external side and end view of the charging case 120 and FIG. 3b shows an internal view of the components of the charging case 120 from a side and end view. As shown most clearly in FIG. 3b the charging case 120 includes an appropriately shaped recess 122 which provides the receiving means to receive the aerosol generating device 110 in the charging position. The recess 122 has a shape which conforms to the body of the device 110 such that it may provide a partial friction fit to hold the device 110 in the charging position. In other examples magnets ora mechanical clasp may be used to releasably retain the device 110 securely in the charging position.

The case 120 further includes a battery 123, shown in FIG. 3b, from which the aerosol generating device 110 may be charged when received in the charging position. As described above, when received in the charging position the aerosol generating device 110 may be charged wirelessly or via electrical contacts. In the example of FIGS. 1 to 3, the aerosol generating device 110 includes an electrical contact on an external surface of the body (not shown) which is arranged such that it contacts a corresponding contact of the charging case 120 when placed in the recess 122 of the case 120. As can be seen from FIG. 3b, the recess is shaped such that it conforms to the shape of the body 113 of the aerosol generating device 110 such that when the device 110 is placed in the recess 122 it is held securely in the charging position. In this position the battery 123 is connected via circuitry to the corresponding contacts and therefore current may pass from the battery of the charging case to the aerosol generating device 110. As can be seen from FIG. 3b the battery may have a larger volume that would be possible to include in the aerosol generating device itself 110 therefore providing the advantage of a reduction in frequency with which the battery 123 of the case may be charged relative to the battery of known aerosol generating devices. When the battery 123 of the case needs to be charged it may be connected to a main supply via a charging cable (not shown) via a power inlet in the case body for example at position 124.

As more clearly seen in FIG. 1, the case 120 further includes a case lid 126 which is connected to the main case body via a hinge allowing movement between an open position, in which the aerosol generating device may be placed in and removed from the case, and a closed position, in which the device 110 is enclosed and retained within the case.

The receiving means provided by the recess 122 is arranged such that the heating chamber 111 faces outwards and is therefore accessible when the device is received in the charging position. In this example the recess is shaped such that it conforms to the side of the aerosol generating device opposite the heating chamber 111 such that the device must be placed in this orientation to allow the heating chamber lid 112 to face outwards out of the case and may be accessible to the user. In this way the heating chamber lid is moveable when the device is received within the case to allow simultaneous charging and exchange of the consumable. The recess may further include a magnet to further retain the device 110 in the charging position.

Returning to FIG. 1 which shows the aerosol generating device received in the recess 122 providing the charging position, it can be seen that the lid 112 is exposed such that it may be moved between the open and close position while the device is received in the recess 122. In this way, while the battery of the aerosol generating device 110 is being charged via the connection to the battery of the case 120 the user may carry out the exchange procedure illustrated in FIGS. 2a to 2c to replace a consumable 130 in the heating chamber 111.

As can be seen in FIG. 1 the charging case 120 may include additional storage of consumables 130 provided by a consumable storage portion 125. The consumable storage portion 125 may provide an array of consumables 130 which are releasable retained in a portion 125 within the case 120. In this example the consumable storage portion 125 is provided on an inner side of the case lid 126 such that they are easily accessible when the lid 126 is in the open position. In this way, the process of exchanging the consumable is further simplified.

FIG. 4 illustrates the use of the aerosol generating system of this example of the present invention. In FIG. 4a the hinged lid 126 of the charging case 120 is opened to expose the aerosol generating device 110 and the consumable storage portion 125. As can be seen in FIG. 4a, the aerosol generating device 110 is received in the recess such that it is engaged with the battery of the case, thus providing charging of the device battery, and the heating chamber lid 112 is moveable to allow access to the heating chamber 111. The lid 112 of the heating chamber 111 is in the open position in which the lid 112 is slid towards the mouth end 114 of the body 113 of the device 110 to expose the chamber 111.

Figure 4A:
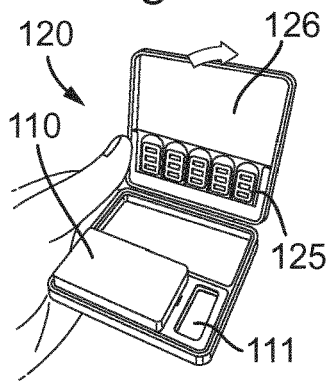
FIGS. 4A to 4J illustrate the consumable exchange procedure using an aerosol generating system according to the present invention.
Figure 4B:
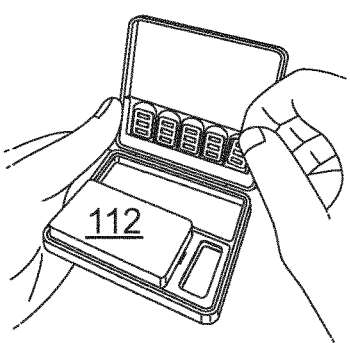
Figure 4C:
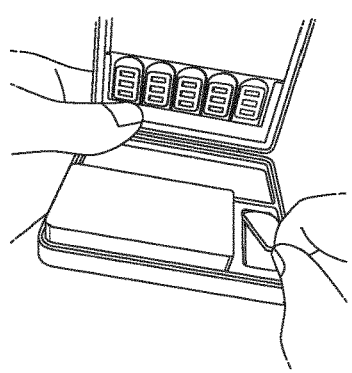
Figure 4D:
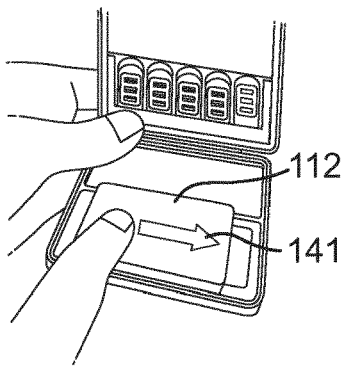
Figure 4E:
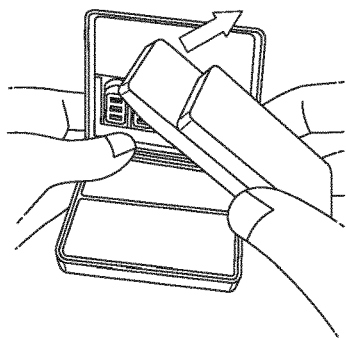

In FIG. 4b a selected consumable 130 is removed from the consumable storage portion 125 by the user applying a force to overcome the retention means to release the consumable 130. The consumable 130 is then placed into the heating chamber 111 of the aerosol generating device 110 as shown in FIG. 4c. While the lid 126 of the case 120 is in the open position the lid 112 of the heating chamber 111 of the device may be slid in direction 141 to translate the lid 112 relative to the body portion 113 of the device to enclose the consumable within the heating chamber, as shown in FIG. 4d. When the aerosol generating device 110 is sufficiently charged, the device 110 may be removed from the recess 122 of the case 120 as shown in FIG. 4e.

Figure 4F:
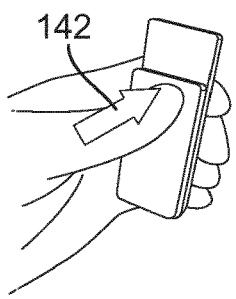
Figure 4G:
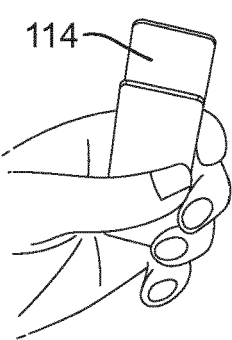
Figure 4H:
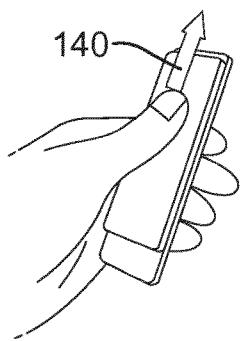
Figure 4I:
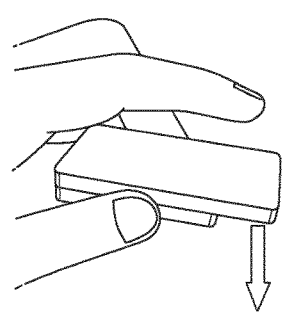
Figure 4J:
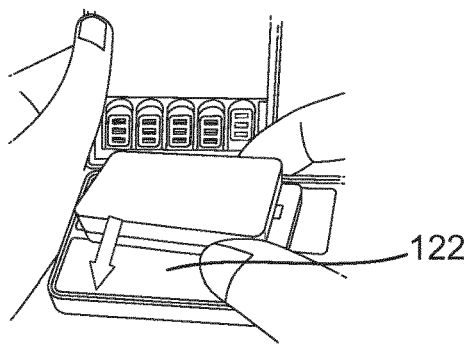

The device 110 may be activated by providing an inward force to the slideable lid portion 112 in the direction of arrow 142 to activate a switch to turn the device on as shown in FIG. 4f. The user may then inhale vapour from the exposed mouthpiece portion 114 of the main body 113 as shown in FIG. 4g. When the consumable is depleted, which optionally may be indicated by an LED provided on the device 110, the spent consumable 130 may be extracted from the device 110 by sliding the case lid in the open direction 140 shown in FIG. 4h and turning the device over to allow the spent consumable to fall out of the exposed heating chamber 111 as shown in FIG. 4i. The device may then be returned to the charging case by placing the device into the recess 122 such that it is returned to the charging position as shown in FIG. 4j.

Figure 5A:
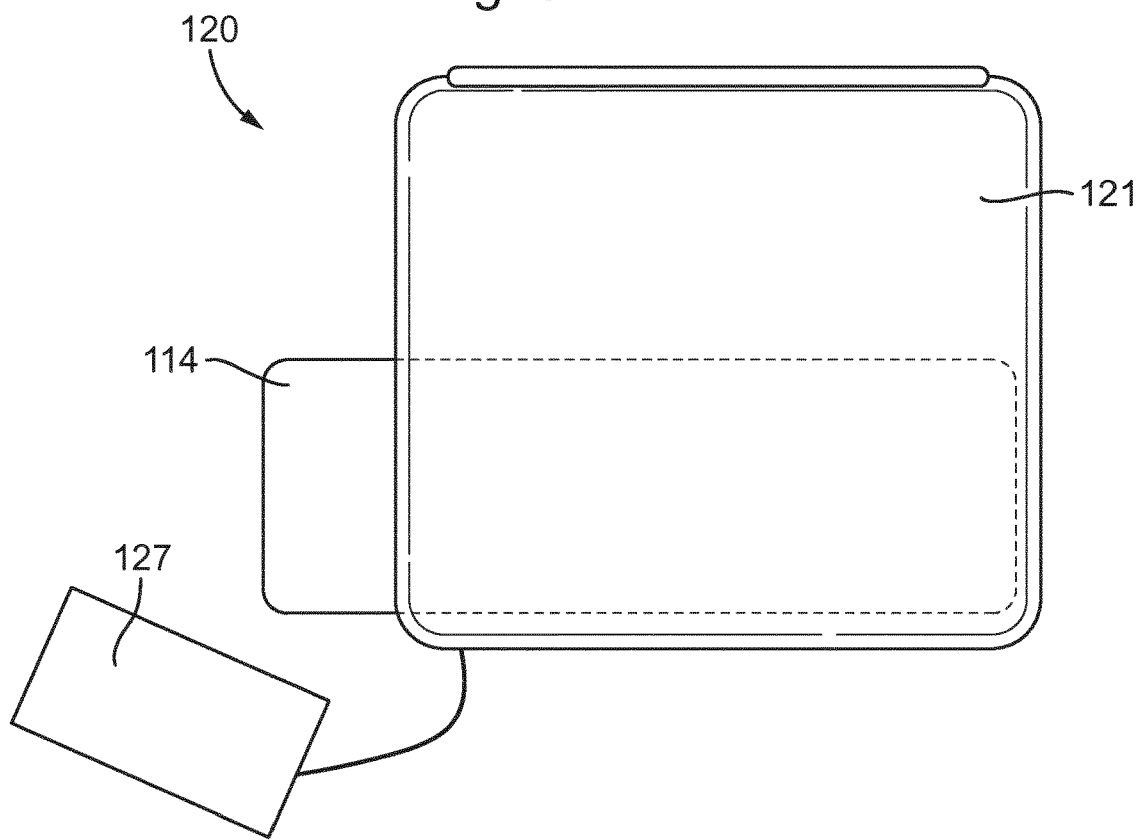
FIGS. 5A and 5B show an alternative aerosol generating system according to the present invention.
Figure 5B:
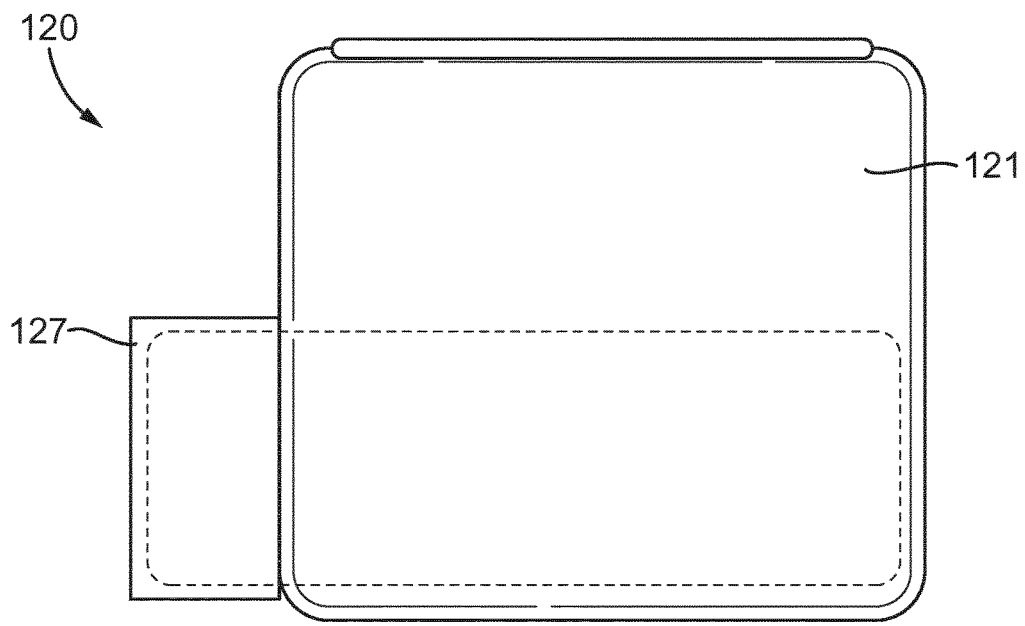

FIG. 5 shows an alternative example of the aerosol generating system according to the present invention. This example is substantially similar to the described above with reference to FIGS. 1 to 4. However in this example, the aerosol generating device and case are configured such that the mouthpiece 114 of the devices extends outside of the charging case 120, as shown in FIG. 5a. In particular the size of the device 110 and mouthpiece 114 and the arrangement of the receiving means are appropriately configured such that the mouthpiece 114 extends out of an opening in the body of the case 120. In this way, a user can continue to use the device and inhale generated vapour through the mouthpiece 114, even when the device 110 is enclosed in the case 120. In this example the case 120 may further include a mouthpiece cap 127 which is arranged so as to enclose the exposed mouthpiece portion 114 such that the mouthpiece can be protected when not being used. These examples allow continuous use even when the aerosol generating device is being charged within the charging case.

The aerosol generating system of the present invention, vastly simplifies the processes required to replenish the consumables and recharge the battery of the an aerosol generating device, while protecting the device from damage and contamination. By providing an aerosol generating device including a charging case, the frequency with which the device must be charged is reduced since, given the intrinsic larger volume of the case, a larger battery may be included in the case than the device. By charging the device with the larger volume battery, the device may be used for longer periods of time before a user must recharge from the mains. Furthermore the inconvenience of carrying a power cable is no longer necessary as the device may be charged by simply carrying within the case, which can also be a less cumbersome shape and thus less of an inconvenience to carry. Since the case includes a receiving means arranged such that, when the device is in the charging position, the lid of the heating chamber is exposed, the process of exchanging the consumable is more straightforward. In particular, the aerosol generating device may be supported within the case in the receiving means during exchange, thus reducing the dexterity required in replacing the consumable. Furthermore, exchange of the consumable and charging of the battery may be carried out simultaneously, thus further simplifying the required replenishing processes.

The invention claimed is:

1. An aerosol generating system comprising an aerosol generating device and a charging case for charging the aerosol generating device when it is received in the case, the aerosol generating device comprising:
 a device battery;
 a heating chamber comprising a lid arranged to move between an open and closed position to allow a consumable to be received in the heating chamber; the charging case comprising:
 a case battery;
 a receiving means for receiving the aerosol generating device in a charging position within the case; wherein, when the aerosol generating device is received in the charging position:
  the device battery is connectable to the case battery to charge the device battery; and
  the lid of the heating chamber is moveable to allow a consumable to be inserted or removed from the heating chamber by a user,
 wherein, in the open position, the lid of the heating chamber exposes the heating chamber and covers a mouthpiece of the aerosol generating device, and, in the closed position, the lid of the heating chamber covers the heating chamber and exposes the mouthpiece of the aerosol generating device.

2. The aerosol generating system of claim 1, wherein the receiving means are arranged to only accept the aerosol generating device in one or more specific orientations, where one or more of the specific orientations correspond to the charging position.

3. The aerosol generating system of claim 1, wherein the aerosol generating device and charging case comprise corresponding electrical contacts arranged such that they connect the battery of the device to the case battery when the aerosol generating device is in the charging position.

4. The aerosol generating system of claim 1, wherein the device battery is wirelessly connectable to the case battery when the aerosol generating device is in the charging position.

5. The aerosol generating system of claim 1, wherein the charging case further comprises a case lid moveable between:
   a closed position in which the aerosol generating device is retained in the case; and
   an open position in which the heating chamber lid of the aerosol generating device is accessible to allow movement of the heating chamber lid between the open and closed position when the aerosol generating device is received in the case.

6. The aerosol generating system of claim 5, wherein the lid of the heating chamber is enclosed within the case and inaccessible to a user when the case lid is in the closed position.

7. The aerosol generating system of claim 1, wherein the receiving means are arranged to releasably retain the aerosol generating device in the charging position.

8. The aerosol generating system of claim 7, wherein the receiving means provide the releasable retention by including one or more of:
   a magnet;
   a recess arranged to conform to at least part of the shape of the aerosol generating device;
   a mechanical clasp.

9. The aerosol generating system of claim 8, wherein the receiving means is a recess which is shaped so as to only accept the reverse side of the aerosol generative device to the heating chamber lid such that the heating chamber lid faces outwards from the case when the aerosol generating device is received in the case.

10. The aerosol generating system of claim 1, wherein the aerosol generating device further comprises the mouthpiece and the mouthpiece extends outside of the case when the aerosol generating device is received in the charging position such that a user can inhale vapour from the device during charging.

11. The aerosol generating system of claim 10, the aerosol generating device further comprising a mouthpiece cap arranged to cover the mouthpiece of the aerosol generating device.

12. The aerosol generating system of claim 1, wherein the charging case comprises a consumable storage portion arranged to retain one or more consumables configured for use with the aerosol generating device.

13. The aerosol generating system of claim 12, wherein the charging case further comprises a case lid moveable between:
   a closed position in which the aerosol generating device is retained in the case; and
   an open position in which the heating chamber lid of the aerosol generating device is accessible to allow movement of the heating chamber lid between the open and closed position when the aerosol generating device is received in the case; and
   wherein the consumable storage is accessible to a user when the case lid is in the open position and enclosed within the case when the case lid is in the closed position.

14. The aerosol generating system of claim 1, wherein each of the heating chamber lid and the case lid is one of:
   a slide lid;
   a hinged lid; or
   a removable lid.

15. A charging case for an aerosol generating device, the aerosol generating device comprising a device battery and a heating chamber with a lid arranged to move between an open and closed position to allow a consumable to be received in the heating chamber; the charging case comprising:
   a case battery;
   a receiving means configured to receive the aerosol generating device in a charging position within the case;
   wherein, when the aerosol generating device is received in the charging position:
   the case battery is connectable to the device battery to charge the device battery; and
   the aerosol generating device is oriented to expose the lid of the heating chamber to allow a consumable to be inserted or removed from the heating chamber by a user,
   wherein a mouthpiece of the aerosol generating device is configured to extend out of an opening in a body of the charging case when the aerosol generating device is received within the charging case and the device battery is being charged by the case battery.

* * * * *